L. J. ATWOOD.
Wick Raisers.
No. 113,833. Patented Apr. 18, 1871.
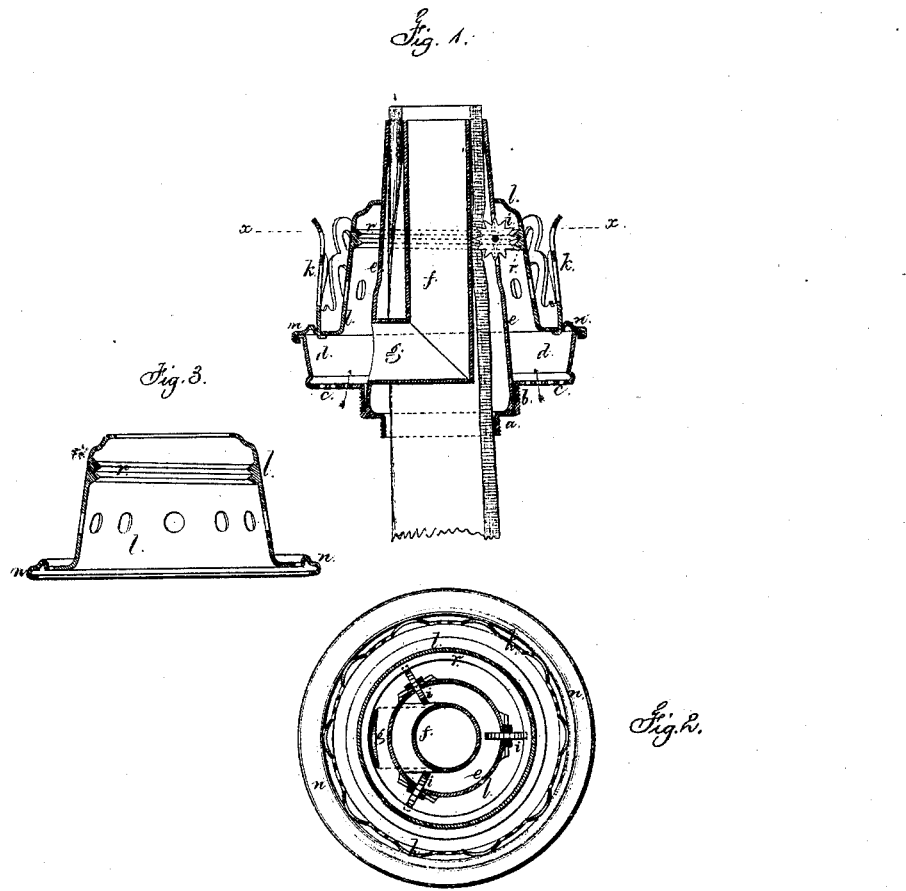

United States Patent Office.

LEWIS J. ATWOOD, OF WATERBURY, CONNECTICUT, ASSIGNOR TO THE PLUME & ATWOOD MANUFACTURING COMPANY, OF SAME PLACE.

Letters Patent No. 113,833, dated April 18, 1871.

IMPROVEMENT IN LAMP-BURNERS.

The Schedule referred to in these Letters Patent and making part of the same.

*To all whom it may concern:*

Be it known that I, LEWIS J. ATWOOD, of Waterbury, in the county of New Haven and State of Connecticut, have invented and made an Improvement in Lamps; and the following is declared to be a correct description of the same.

This invention is in that class of lamps where a flat wick is brought up into a cylinder to produce an Argand flame.

Difficulties have been experienced in raising and lowering the wick with uniformity all around its upper end. Beside this the lamp-reservoirs are made with collars differing in diameter, so that a burner that will screw upon one size of collar is not adapted to the other size of collar without a movable ring or band.

My invention is made for the purpose of meeting the before-mentioned difficulties, and consists in a series of wick-raising wheels arranged around the wick-tube, in combination with a surrounding screw-thread or sections of a screw-thread revolved by turning the chimney-holder or a portion of the burner, so that said screw-section in its movement shall operate upon all of the wick-raising wheels with uniformity, and either raise or lower the wick.

I also provide upon the base of the burner itself two screws of a size to fit the two sizes of collars upon the reservoirs, so that the burner can be applied to any reservoir of the ordinary character.

In the drawing—

Figure 1 is a vertical section of the lamp-burner complete;

Figure 2 is a sectional plan at the line $x\ x$; and

Figure 3 shows the screw-thread cone and base separately.

The base of the burner is made of the two screws $a$ and $b$, air-distributer $c$, and shell $d$.

Within the screw $b$ rises the tapering wick-tube $e$, and inside of this is the air-tube $f$, with a lateral inlet at $g$, and the wick passes up between the tubes $e$ and $f$, to form an Argand flame, in the manner heretofore well known.

The wick-raising wheels $i$ are introduced in slots cut in the wick-tube $e$, and revolve upon horizontal pins secured to such wick-tube, or upon a wire or ring surrounding the same.

Two or more of said wheels $i$ may be used. I prefer to employ three or four placed at equal distances apart.

The chimney-holder $k$ is attached to the cone $l$, and the base $n$ of this cone is turned over and incloses the projecting lip at the edge of the shell $d$, but the parts fit loosely, so that, although the shell and base of the cone are permanently connected, the latter, together with the chimney-holder and cone, can be revolved freely around the wick-tube.

The cone $l$ at its upper end sits closely around the wick-tube $e$, and within said cone is the screw $r$, attached in place, and taking the outer sides of the wick-raising wheels $i$, so that the revolution of the said screw $r$, by turning the cone, will revolve the wick-raisers in one direction or the other, and elevate or depress the wick.

The cone $l$, base $n$, and chimney-holder $k$ are connected together and inclose the wick-raising wheels, and hence the wick-raising wheels are protected and the wick raised or lowered by revolving the chimney-holder.

I claim as my invention—

1. The screw $r$ upon the inside of the cone $l$, in combination with the wheels $i$, chimney-holder $k$, wick-tube $e$, and base $n$, substantially as set forth, whereby the wick-raising wheels are operated by the turning of the chimney-holder, as specified.

2. The two screws $a\ b$, made with or permanently connected to the burner, as and for the purposes set forth.

3. The wick-raising wheels $i$, screw $r$, and wick-tube $e$, arranged in relation to the central air-tube $f$ and lateral inlet $g$, as set forth, for moving the flat wick in the Argand wick-tube, as specified.

Signed by me this 2d day of March, A. D. 1871.

L. J. ATWOOD.

Witnesses:
CHAS. H. SMITH,
GEO. T. PINCKNEY.